Dec. 4, 1923.
W. C. SEARLES
CHAIN TIGHTENER TOOL
Filed June 19, 1922
1,476,008
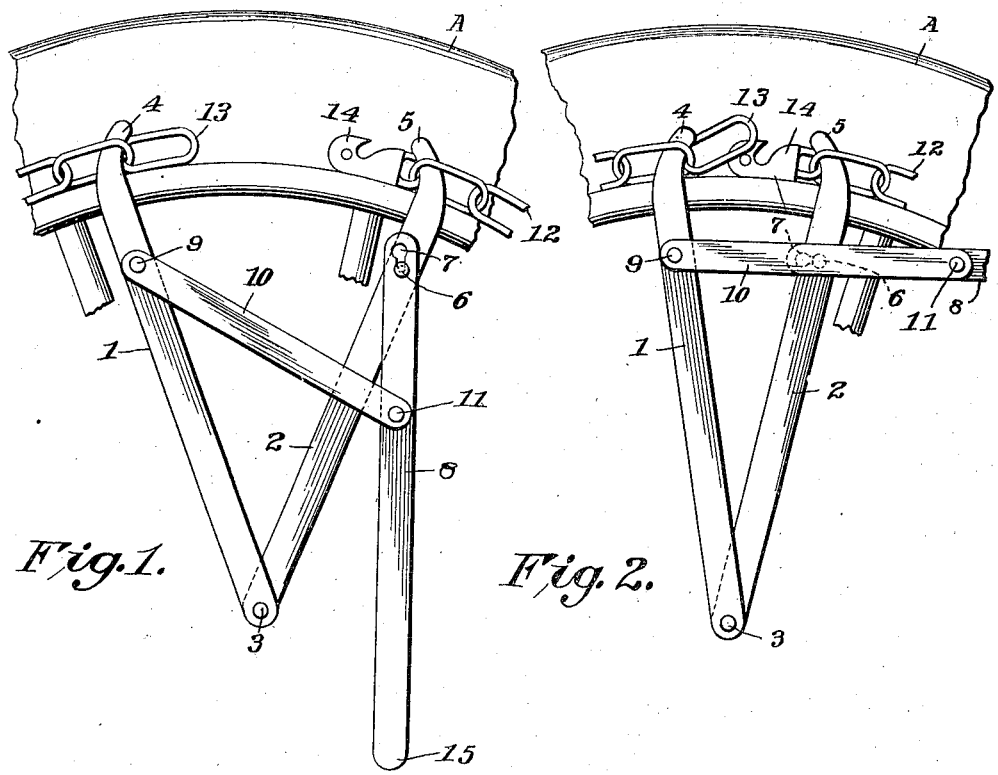
Fig.1.   Fig.2.
Fig.3.
Fig.4.
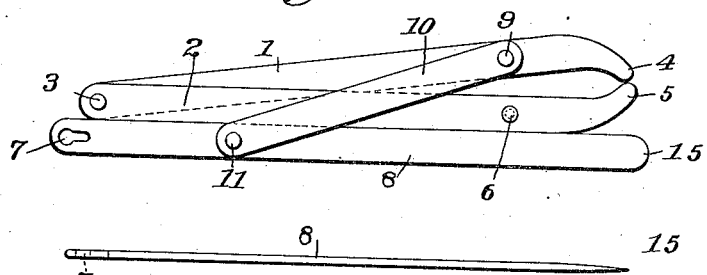
Inventor
William C. Searles,
By
Attorney Patented Dec. 4, 1923.

1,476,008

UNITED STATES PATENT OFFICE.

WILLIAM C. SEARLES, OF NEWPORT, NEBRASKA, ASSIGNOR OF ONE-HALF TO FRANK L. HUTTON, OF NEWPORT, NEBRASKA.

CHAIN-TIGHTENER TOOL.

Application filed June 19, 1922. Serial No. 569,249.

*To all whom it may concern:*

Be it known that I, WILLIAM C. SEARLES, a citizen of the United States, residing at Newport, in the county of Rock and State of Nebraska, have invented new and useful Improvements in Chain-Tightener Tools, of which the following is a specification.

This invention relates to a tool to be used in placing anti-skid chains on the tires of vehicle wheels, and has for an object to provide a tool which will be inexpensive of manufacture and easily operated.

Another object of my invention is to provide a tool, which, when the chain is drawn tightly around the tire, will stay in this position and allow the person applying the chains to have both hands free to secure the ends together.

Another object is to provide a tool which may be folded when not in use and stored away in the tool chest, occupying small space.

With these and other objects in view the invention consists in the construction and novel combination and arrrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings, in which like characters of reference designate corresponding parts in the several views:—

Figure 1 is a view of the tool applied to the chain and in position to tighten same.

Figure 2 is a view similar to Fig. 1, but showing the tool after it has been operated to bring the ends of the chain together.

Figure 3 is a view of the tool as when folded.

Figure 4 is a side view of the operating handle.

Reference is had to the accompanying drawings in which 1 and 2 represent a pair of arms which are pivoted together at one end as at 3, and which have their opposite or outer ends bent inwardly to form hooks 4 and 5. Projecting from the arm 2, at a point adjacent its outer end, is a headed stud 6, which is adapted to cooperate with a keyhole slot 7 to secure an operating handle 8 to the arm 2 and also to act as a fulcrum for the same when the tool is being operated. A link 10 is pivotally connected at 9 to the arm 1 and has its other end pivoted to the operating handle at 11. This link forms the connection between the handle and the arm 1 so that the two arms will be moved toward or from each other when the handle is operated, as will be hereinafter described.

When it is desired to apply the chains, they are placed on the tire A and the hook portions of the arms 1 and 2 are inserted into the side chain 12 adjacent the ends thereof, as clearly shown in Fig. 1. Then by raising the handle, which is pivoted on the stud 6, upwardly the link 10 will be moved from the position shown in Fig. 1 to that shown in Fig. 2, and the arms 1 and 2 brought closely together so that the link 13 on one end of the side chain may be readily and easily inserted into the usual retainer 14, which is applied to the other end of the side chain.

It is to be noted that when the operating handle 8 has been raised to the position shown in Fig. 2 that the link 10 is in alignment with the handle and the pull is exerted on the center of the link, in which position the tool will stay without any danger of it allowing the chain to loosen, thus giving the person who is applying the chains the use of both hands in fastening the ends of the chain together.

When it is desired to put the tool away the handle 8 is removed from the stud 6 and swung around on the pivot 10 so that the whole tool may be folded, as shown in Fig. 3, in which position it requires very little space.

The end of the handle is flattened as at 15 and is adapted to be used as a tire tool for taking tires from the rims of wheels, such as are used on Ford automobiles.

The pivots 3, 9 and 11 may be such that the tool cannot be taken apart or if desired these pivots may allow the tool to be taken apart, this latter arrangement being particularly beneficial when it is desired to use the handle as a tire tool.

It is seen from the above that I have provided a tool which makes the application of tire chains a simple operation and that they may be put on tightly enough so that they will not rattle or strike the fender as the wheel turns. It will also be seen that as all of the parts are made out of flat iron bars that the cost of manufacturing is reduced to a minimum.

Having thus described my invention, I claim:—

1. A tool of the class described, comprising a pair of arms pivotally connected at one end, an operating handle pivoted to one of the arms, and a link pivoted to the other arm and to the operating handle, the pivot points of the link and handle being such that, when the arms are brought together the pull will be on the center of the pivots and the parts will stay in such position even when a pull is being exerted on the outer ends of the arms.

2. A tool of the class described comprising a pair of arms pivoted together at their lower ends and having bent portions forming chain engaging hooks at the other ends thereof, a stud on one of the arms, an operating handle having a key-hole slot therein at one end adapted to detachably engage said stud, a link pivoted to the other arm and to the operating handle, the pivot points of the link and arm and the operating handle and other arm being disposed in the same horizontal plane, whereby when the arms have reached their limit of contraction due to the operation of the handle, the pivot point of the link and handle will be disposed in the same plane with the aforesaid pivots and maintain the arms in their contracted position.

In testimony whereof I have hereunto set my hand.

WILLIAM C. SEARLES.